US009792218B2

(12) United States Patent
Duzett

(10) Patent No.: US 9,792,218 B2
(45) Date of Patent: Oct. 17, 2017

(54) DATA STORAGE METHODS AND APPARATUSES FOR REDUCING THE NUMBER OF WRITES TO FLASH-BASED STORAGE

(75) Inventor: Robert C Duzett, Hillsboro, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 621 days.

(21) Appl. No.: 13/112,131

(22) Filed: May 20, 2011

(65) Prior Publication Data

US 2012/0297112 A1 Nov. 22, 2012

(51) Int. Cl.
*G06F 12/00* (2006.01)
*G06F 13/00* (2006.01)
*G06F 12/0897* (2016.01)
G06F 12/0866 (2016.01)
G06F 12/0888 (2016.01)

(52) U.S. Cl.
CPC ...... *G06F 12/0897* (2013.01); *G06F 12/0866* (2013.01); *G06F 12/0888* (2013.01); *G06F 2212/222* (2013.01); *G06F 2212/225* (2013.01); *G06F 2212/464* (2013.01)

(58) Field of Classification Search
CPC ............. G06F 12/08; G06F 12/0893; G06F 12/30221; G06F 12/0862; G06F 17/30132; G06F 3/068; G06F 3/0685; G06F 2212/217
USPC ..................... 711/103, 117, 4, 111
See application file for complete search history.

(56) References Cited

U.S. PATENT DOCUMENTS

| 8,370,597 | B1 * | 2/2013 | Chatterjee et al. ........... 711/170 |
| 2004/0243761 | A1 * | 12/2004 | Bohrer et al. ................ 711/114 |
| 2007/0043914 | A1 * | 2/2007 | Nodomi ........................ 711/141 |
| 2008/0235468 | A1 * | 9/2008 | Chen .................. G06F 12/0246 711/154 |
| 2009/0216910 | A1 * | 8/2009 | Duchesneau ......... G06F 9/5072 709/250 |
| 2009/0300397 | A1 * | 12/2009 | Nguyen et al. ............... 713/324 |
| 2009/0307433 | A1 * | 12/2009 | Jones et al. .................... 711/137 |
| 2010/0088459 | A1 * | 4/2010 | Arya ....................... G06F 3/061 711/103 |
| 2010/0095070 | A1 * | 4/2010 | Okawara et al. ............. 711/137 |
| 2010/0199021 | A1 * | 8/2010 | Harper ................ G06F 11/1441 711/103 |
| 2010/0325352 | A1 * | 12/2010 | Schuette ............... G06F 3/0613 711/103 |
| 2011/0153931 | A1 * | 6/2011 | Bell, Jr. ................ G06F 3/0611 711/114 |
| 2012/0303942 | A1 * | 11/2012 | Peacock ............. G06F 12/0875 713/2 |
| 2013/0238851 | A1 * | 9/2013 | Chang ..................... G06F 3/061 711/113 |
| 2014/0164675 | A1 * | 6/2014 | Ehrlich ............... G06F 12/0246 711/103 |

* cited by examiner

*Primary Examiner* — Sean D Rossiter
(74) *Attorney, Agent, or Firm* — Stewart M. Wiener

(57) ABSTRACT

Methods and apparatuses are provided for reducing the number of write operations to a flash-based storage system that stores and replaces data. The storage system includes a first storage implemented using non-flash storage and a second storage implemented using flash memory. Missed data is first stored in the first storage, which can be less sensitive than flash to write operations. The missed data is stored in the flash-based second storage only after the missed data satisfies a storage management algorithm.

28 Claims, 7 Drawing Sheets

DATA STORAGE METHODS AND APPARATUSES FOR REDUCING THE NUMBER OF WRITES TO FLASH-BASED STORAGE

TECHNICAL FIELD

This disclosure relates to data storage methods and apparatuses for reducing the number of writes to flash-based storage.

BACKGROUND

With its greater storage capacity over RAM for the same physical space (density) and faster read access time (speed) over rotating hard disk drives (HDDs), for example, it is becoming increasingly desirable to use flash memory (e.g., NAND flash) over traditional storage for systems requiring high-capacity, high bandwidth/throughput storage. For example, an on-demand video delivery system can require high-capacity, high bandwidth storage in its video servers. The video servers of an on-demand video delivery system can require a large amount of storage to store large video libraries. Also, the video servers can require high bandwidth/throughput to support numerous streams of video to end users. Thus, it can be desirable to implement a video server using flash memory.

However, the duration and reliability of a flash block can degrade with each write/erase operation to the flash block and eventually data no longer can be written to or reliably retained on the flash block. There is a limit to the number of write/erase operations that a flash block can perform before the flash block becomes unusable or unreliable. Furthermore, the read throughput of a flash block can decrease with increased write/erase operations to the flash block. Accordingly, flash performance and reliability may degrade in systems requiring a large number of write/erase operations.

In an on-demand video delivery system, one central video server storing a large library of videos can serve end users in a geographical area. However, this architecture can result in an undesirable amount of network traffic between the central video server and the video servers that serve the end users as the central video server transmits requested videos to the video servers for delivery to end users.

Alternative on-demand video delivery systems attempt to reduce network traffic and traffic delay between the central video server and the video servers by storing smaller video libraries in the video servers. Each video server can store the most requested videos by the end users served by the video server. If a video requested by an end user is not stored in the video server that serves the end user, the video server can request and receive the video from the central video server. The video server then can replace one of the least requested videos stored in the video server with the newly requested video. In this way, the video server can act as a cache. Thus, the storage in video servers is constantly changing as newly requested videos are written to video servers and the least requested videos are erased. Although it can be desirable to implement a video server with flash memory, the performance and reliability of flash may degrade in existing video servers because existing video servers require a large number of write operations.

DETAILED DESCRIPTION

Various implementations of this disclosure reduce the number of write operations to a flash-based storage system that stores and replaces data. The storage system includes a first storage implemented using non-flash storage and a second storage implemented using flash memory. The flash-based second storage constitutes the main storage of the storage system where requested data is initially searched. Every instance of missed data in the second storage does not result in a write operation to the flash-based second storage to store the missed data. Instead, the missed data is first stored in the first storage, which can be less sensitive than flash to write/erase operations. In some implementations, the missed data is stored in the flash-based second storage only after the missed data has been requested a predetermined number of times. This can reduce the number of write operations to the flash-based second storage.

The various implementations described herein are described with reference to flash memory. However, it should be understood that the concepts disclosed herein can be applied to any storage technology and in particular storage that may be sensitive to write operations. Furthermore, the various implementations described herein are described with reference to an on-demand video delivery system, but it should be understood that the concepts disclosed herein can be applied to any system requiring flash-based or write-sensitive storage.

Figure 1:
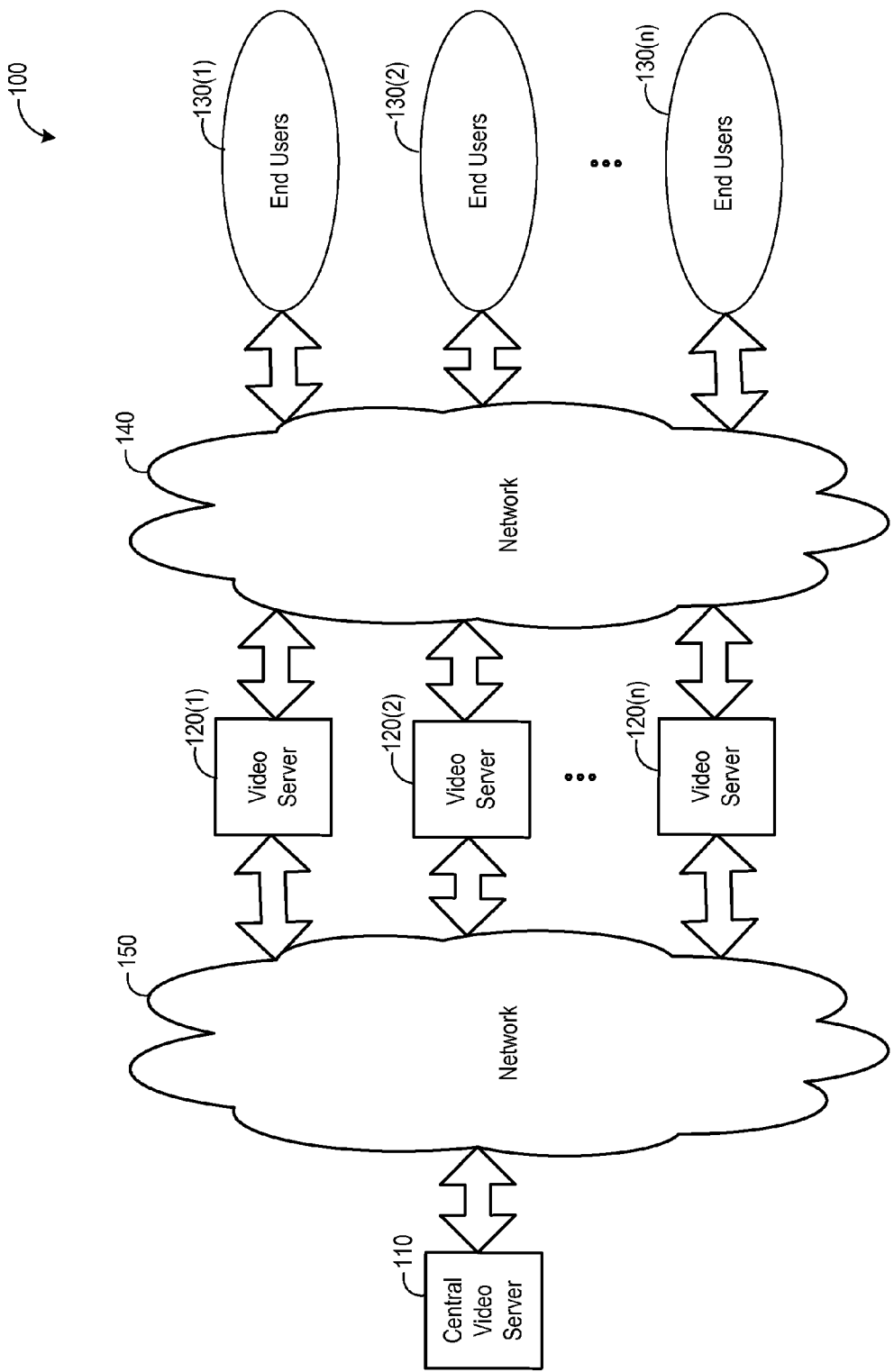
FIG. 1 is a block diagram illustrating an example on-demand video delivery system.

FIG. 1 illustrates an example on-demand video delivery system 100 for delivering videos to end users in a geographical area. The system 100 includes a central video server 110 and multiple video servers 120(1), 120(2), . . . , 120(n). The central video server 110 can store all the video segments available to end users of the system. Each video server 120(i), i=1, . . . , n can store a subset of the video segments stored in the central video server 110 and deliver the video segments over a network 140 to end user groups 130(i), i=1, . . . , n, respectively, for example. One of ordinary skill in the art would understand that, in some implementations, each video server 120(i), i=1, . . . n can deliver videos over a network 140 to end users that are not associated with any groups or to a combination of grouped and ungrouped end users. Each video server 120(i), i=1, . . . n can store up to its capacity the most requested video segments of those video segments requested of that server, for example. The network 140 can be a single integrated network or a set of separate independent networks and can be any type of wired or wireless network or combination thereof. For example, the network 140 can take the form of an all-coax, all-fiber, or hybrid fiber/coax (HFC) network. This disclosure is not limited to any particular system or network. In some implementations, part of the system 100 can be a DOCSIS-based system. For example, each of the video servers 120(i), i=1, . . . n can be located at a corresponding headend where the video is transmitted over a cable network to an end user's cable modem (CM) or settop box (STB), for example, in a corresponding end user group 130(i), i=1, . . . n.

If a video requested by an end user is not stored in the video server to which the request is directed, the video server can request the video from the central video server. The central video server 110 then can transmit the requested video to the requesting video server over a network 150. The video server then can replace a stored video in the video server with the newly requested video based on a replacement algorithm. For example, the video server can erase from the storage the video that has not been requested for the longest time and write the newly requested video to storage. In this way, each of the video servers can act as a cache.

As discussed above, it can be desired to implement a video server using flash because of its density and speed. However, because the performance and reliability of flash can be sensitive to the number of write/erase operations, flash may not be desirable as storage in existing video servers.

Figure 2:
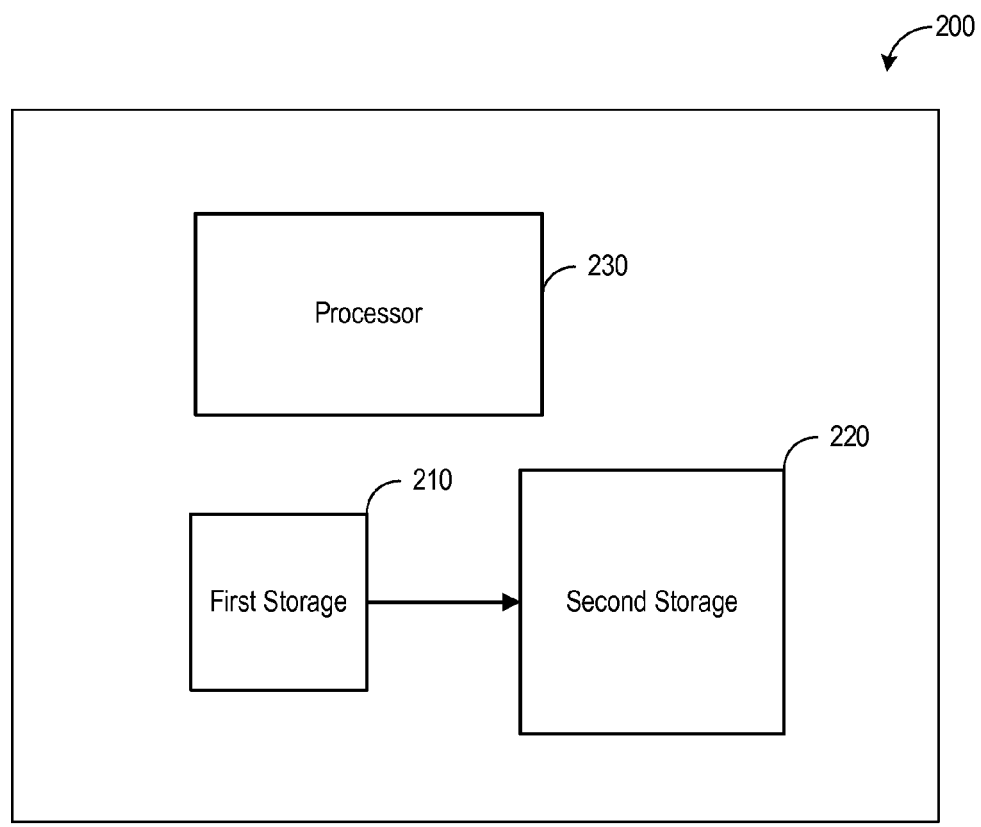
FIG. 2 is a block diagram illustrating a storage system for reducing the number of write/erase operations to a flash-based storage.

FIG. 2 illustrates a storage system 200 for reducing the number of write operations to a flash-based storage that stores and replaces data based on a replacement algorithm (e.g., cache). The storage system includes a first storage 210 implemented using a non-flash storage media, a second storage 220 implemented using flash memory, and a processor 230 executing one or more replacement algorithms and a storage management algorithm.

Preferably, the non-flash storage media of the first storage 210 is insensitive to write operations or less sensitive to write operations than flash. In some implementations, the first storage 210 is implemented using RAM, for example. In some implementations, the first storage 210 is implemented using flash memory. The first storage 210 can be implemented using a flash memory type that is less sensitive to writes than the flash memory type used for the second storage 220. For instance, single-level-cell (SLC) flash is less dense than multi-level-cell (MLC) flash but SLC flash is less sensitive to write operations than MLC flash. Thus, in some implementations, the first storage 210 can be implemented using SLC flash and the second storage 220 can be implemented using MLC flash, for example.

The second storage 220 constitutes the main storage of the storage system 200 where requested data is initially searched. The first storage 210 stores requested data that is not stored in the second storage 220 ("missed data") after it has been retrieved from an external storage location (not shown). In some implementations, the capacity of the first storage 210 is smaller than the second storage. In this way, a reduction in the number of write operations to the flash-based second storage can be achieved with an incremental investment in write-friendly storage. In some implementations, due to the cost of flash-based storage, the second storage 220 can include a combination of flash and non-flash store (e.g., RAM or HDD storage). In some implementations, the second storage 220 is non-flash storage. In some implementations, the second storage 220 is non-flash storage that is sensitive to write operations.

Figure 3:
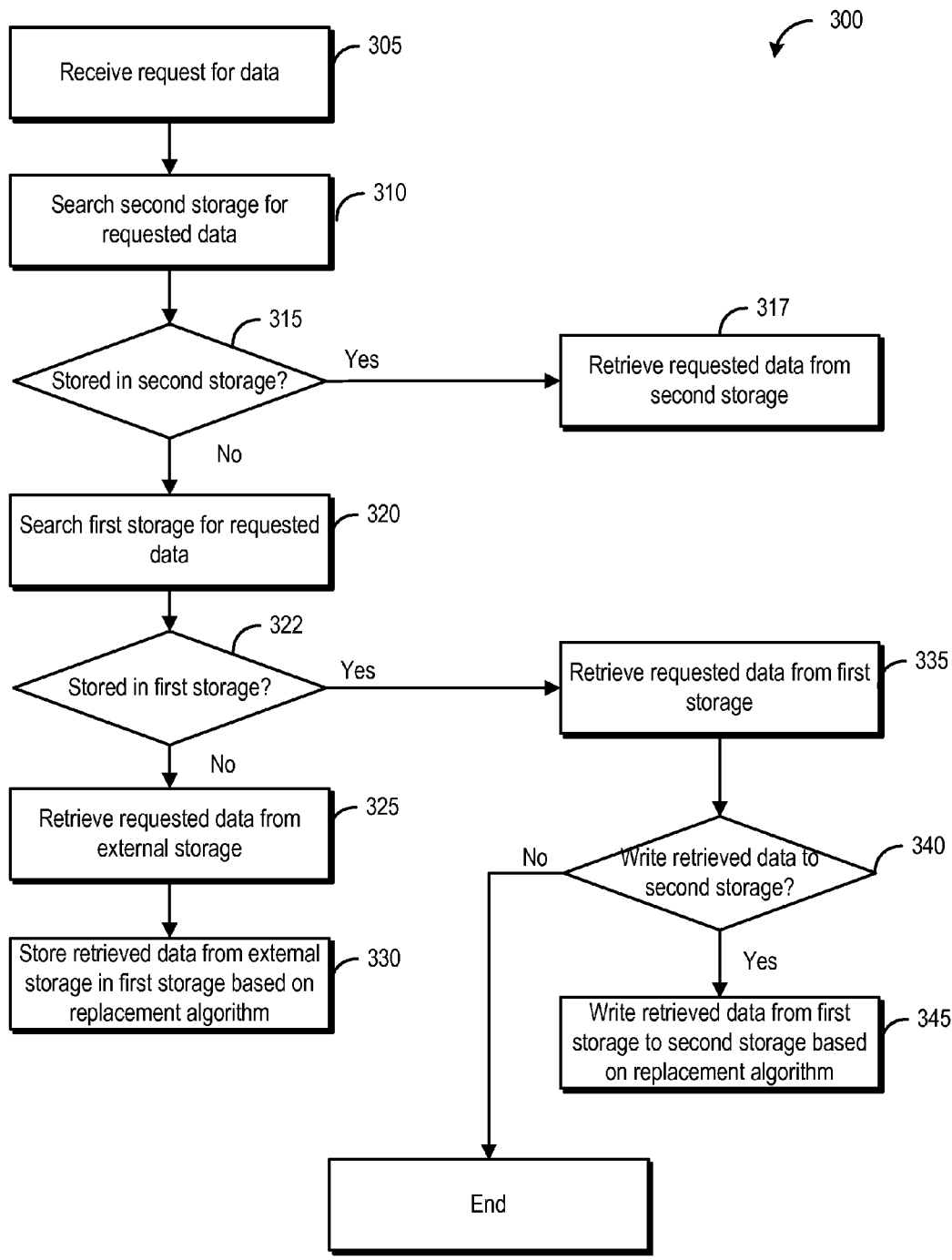
FIG. 3 is a flowchart illustrating a first example process for reducing the number of write/erase operations to the flash-based storage of the storage system of FIG. 2.

FIG. 3 illustrates an example process 300 for reducing the number of write operations to the flash-based storage 220 of the storage system 200 of FIG. 2.

At stage 305, a request for data is received. The request can be received, for example, by processor 230 of FIG. 2.

At stage 310, the second storage 220 is searched for the requested data. The second storage can be searched, for example, by processor 230 of FIG. 2.

At stage 315, a determination is made whether the requested data is stored in the second storage 220. The determination can be made, for example, by processor 230 of FIG. 2. If the requested data is stored in the second storage 220 ("hit") ("Yes" at stage 315), then, at stage 317, the requested data is retrieved from the second storage 220 pursuant to the request received at stage 305. The requested data can be retrieved, for example, by processor 230 of FIG. 2. If the requested data is not stored in the second storage 220 ("miss") ("No" at stage 315), then, at stage 320, the first storage 210 is searched for the requested data. The first storage can be searched, for example, by processor 230 of FIG. 2. At stage 322, a determination is made whether the requested data is stored in the first storage 210. The determination can be made, for example, by processor 230 of FIG. 2.

If the requested data is not stored in the first storage 210 ("No" at stage 322), then, at stage 325, the requested data is retrieved from an external storage. The requested data can be retrieved, for example, by processor 230 of FIG. 2. At stage 330, the retrieved data from the external storage is stored in the first storage 210 instead of being written to the second storage 220. The retrieved data can be stored in the first storage, for example, by processor 230 of FIG. 2. The retrieved data from the external storage can replace stored data in the first storage 210 based on a replacement algorithm executed, for example, by processer 230 of FIG. 2. This disclosure is not limited to any particular replacement algorithm. Any existing or future developed replacement algorithm is intended to be included within the scope of this disclosure. Thus, the first storage 210 can operate as a cache.

If the requested data is stored in the first storage 210 ("Yes" at stage 322), then, at stage 335, the requested data is retrieved from the first storage 210 pursuant to the request received at stage 305. The requested data can be retrieved from the first storage, for example, by processor 230 of FIG. 2.

At stage 340, a determination is made whether to write to the second storage 220 the requested data retrieved from the first storage 210 at stage 335. This determination can be made, for example, based on a storage management algorithm executed by, for example, processer 230 of FIG. 2. For example, in some implementations, requested data retrieved from the first storage is written to the second storage only after the data has been requested a predetermined number of times. To this end, a counter can be implemented that increments each time data is first stored and retrieved from the first storage 210. The counter can be implemented by, for example, processer 230 of FIG. 2. In some implementations, the predetermined number can be adjusted based on desired performance criteria. In this way, write operations to the flash-based storage 220 is reduced. That is, every instance of missed data in the second storage 220 does not result in a write operation to the flash-based storage 220 to store the missed data. Instead, the missed data is first stored in a first storage 210 that can be less sensitive than flash to write/erase operations. The missed data is stored in the flash-based second storage 220 only after the missed data has been requested a predetermined number. This can help the flash-based second storage 220 to store only the most requested data and reduces the number write operations to the flash-based second storage 220. This disclosure is not limited to any particular storage management algorithm. Any existing or future developed storage management algorithm is intended to be included within the scope of this disclosure.

If it is determined at stage 340 to write to the second storage 220 the requested data retrieved from the first storage 210 at stage 335 ("Yes" at stage 340), then, at stage 345, the requested data is stored in the second storage 220. The requested data can be stored in the second storage, for example, by processor 230 of FIG. 2. The retrieved data from the first storage 210 at stage 335 can replace stored data in the second storage 220 based on a replacement algorithm executed by, for example, processor 230. The replacement algorithm for the second storage 220 can be the same as or different from the replacement algorithm for the first storage 210. In some implementations, the retrieved data from the first storage 210 at stage 335 also can be removed from the first storage 210 after it is written to the second storage 220.

Figure 4:
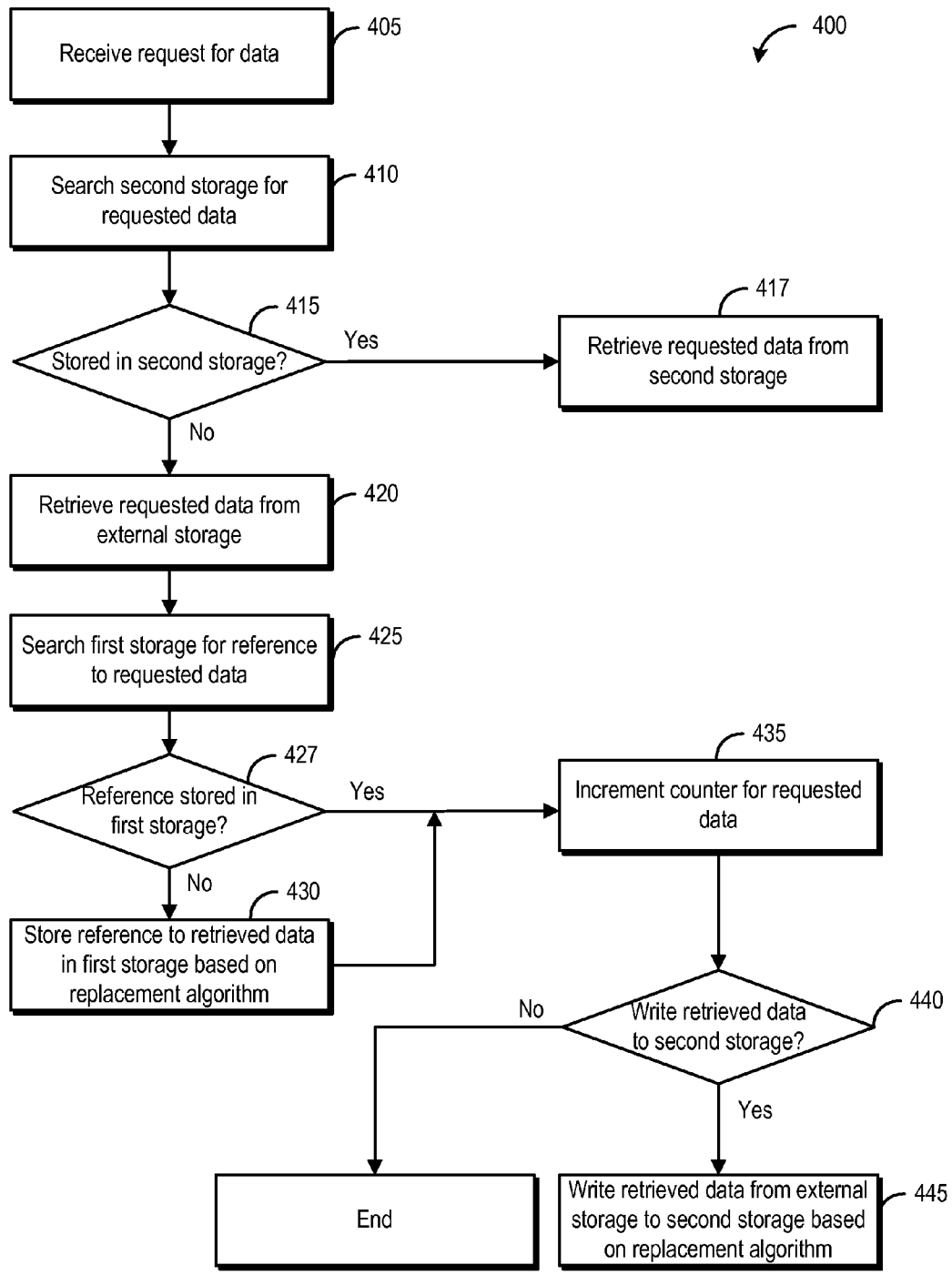
FIG. 4 is a flowchart illustrating a second example process for reducing the number of write/erase operations to the flash-based storage of the storage system of FIG. 2.

In some implementations, the first storage 210 stores a reference to the missed data instead of storing the missed data. The reference can be any identification of the requested data (e.g., title, tag, index) and/or pointer, link, or address to the requested data. FIG. 4 illustrates an example process 400 for reducing the number of write/erase operations to the flash-based storage 220 of the storage system 200 of FIG. 2 when the first storage 210 stores a reference to the missed data instead of storing the missed data.

At stage 405, a request for data is received. The request can be received, for example, by processor 230.

At stage 410, the second storage 220 is searched for the requested data.

At stage 415, a determination is made whether the requested data is stored in the second storage 220. If the requested data is stored in the second storage 220 ("Yes" at stage 415), then, at stage 417, the requested data is retrieved from the second storage 220 pursuant to the request received at stage 405. If the requested data is not stored on the second storage 220 ("No" at stage 415), then, at stage 420, the requested data is retrieved from an external storage.

At stage 425, the first storage 210 is searched for a reference to the requested data. At stage 427, a determination is made whether a reference to the requested data is stored in the first storage 210.

If a reference to the requested data is stored in the first storage 210 ("Yes" at stage 427), then, at stage 435, a counter indicating the number of time the requested data has been requested is incremented. If a reference to the requested data is not stored in the first storage 210 ("No" at stage 427), then, at stage 430, the reference to the retrieved data from the external storage is stored in the first storage 210. The reference to the retrieved data from the external storage can replace a stored reference in the first storage 210 based on a replacement algorithm executed by, for example, processor 230. The process then proceeds to stage 435 where the counter is incremented as discussed above.

At stage 440, a determination is made whether to write to the second storage 220 the requested data retrieved from the external storage at stage 420. This determination can be made, for example, based on a storage management algorithm executed by, for example, processor 230 as discussed above. For example, as discussed above with respect to FIG. 3, in some implementations, requested data retrieved from the external storage is written to the second storage only after the data has been requested a predetermined number of times. To this end, the counter can be used to determine how many times the requested data has been requested. It should be understood that, in some implementations, depending on the storage management algorithm, stage 435 may not exist and additional processes may be performed consistent with the storage management algorithm.

If it is determined at stage 440 to write to the second storage 220 the requested data retrieved from the external storage at stage 420 ("Yes" at stage 440), then, at stage 445, the requested data is stored in the second storage 220. The retrieved data from the external storage at stage 420 can replace stored data in the second storage 220 based on a replacement algorithm executed by, for example, processor 230 as discussed above.

As discussed above, because flash performance and reliability degrade with each write/erase operation, flash may not be desirable for systems requiring a large number of write operations. However, with the storage system 200 of FIG. 2, the advantages of flash can be realized in systems requiring a large number of write operations. For example, the storage system 200 of FIG. 2 can be used in the on-demand video delivery system 100 of FIG. 1.

Figure 5:
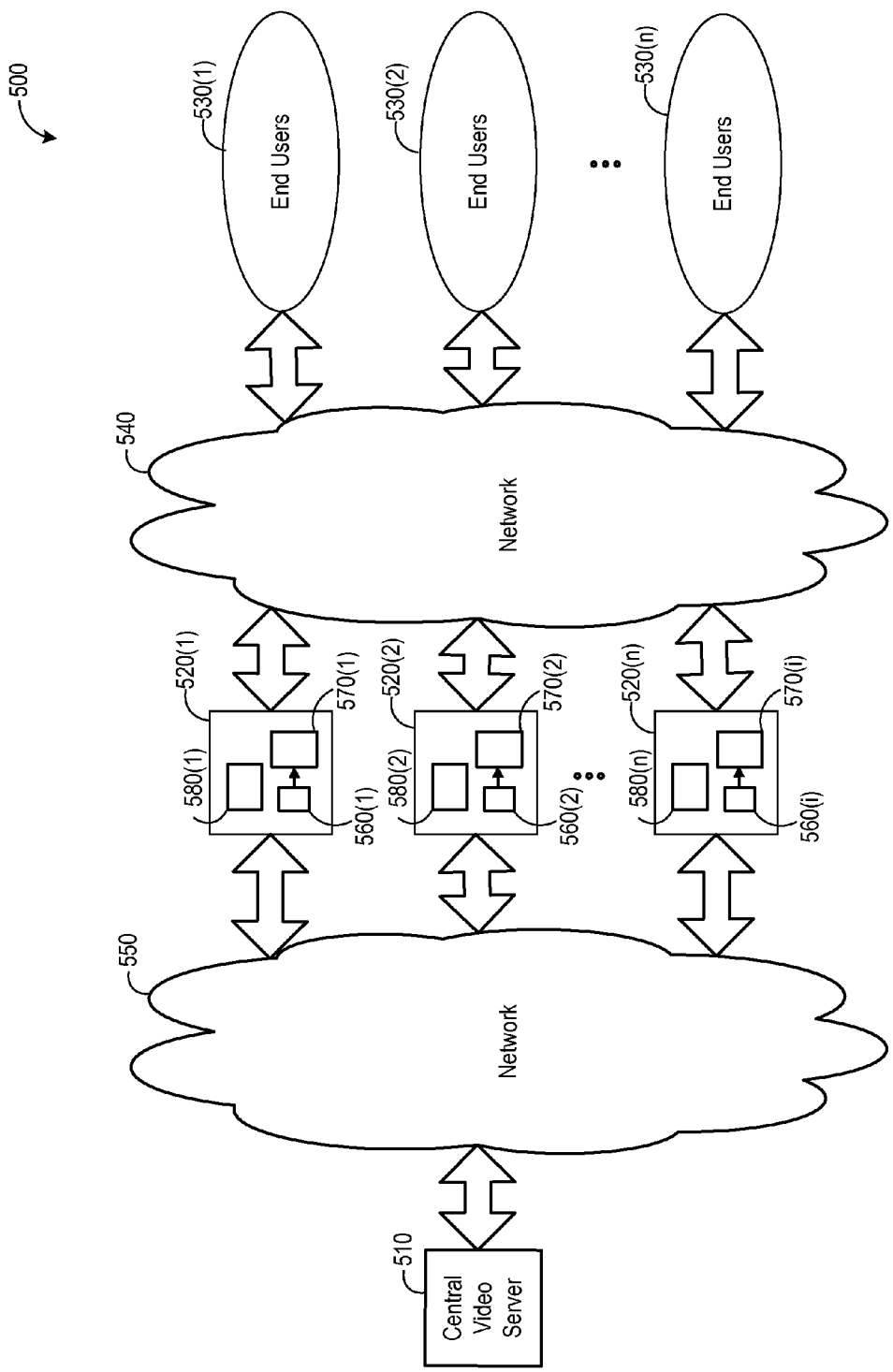
FIG. 5 is a block diagram illustrating an example on-demand video delivery system that implements a video server with flash-based storage using the storage system of FIG. 2.

FIG. 5 illustrates an example on-demand video delivery system 500 that implements a video server with flash-based storage using the storage system 200 of FIG. 2 to reduce the number of write operations to the flash-based storage. The system 500 includes a central video server 510 and multiple video servers 520(1), 520(2), . . . , 520(n). Each video server 520(i), i=1, . . . n includes a first storage 560(i) implemented using a non-flash storage media, a second storage 570(i) implemented using flash, and a processor 580(i) that executes one or more replacement algorithms and a storage management algorithm as discussed above.

The central video server 510 can store all the video segments available to end users of the system 500. Each video server 520(i), i=1, . . . n can store a subset of the video segments in the central video server 510 and deliver the video segments over a network 540 to groups of end users 530(i), i=1, . . . n, respectively.

For each video server 520(i), i=1, . . . n, the second storage 570(i) constitutes the main storage of the video server 520(i) where requested video segments by end users are initially searched. The first storage 560(i) stores requested video segments that are not stored in the second storage 570(i) ("missed videos") after they have been retrieved from the central video server 510.

Figure 6:
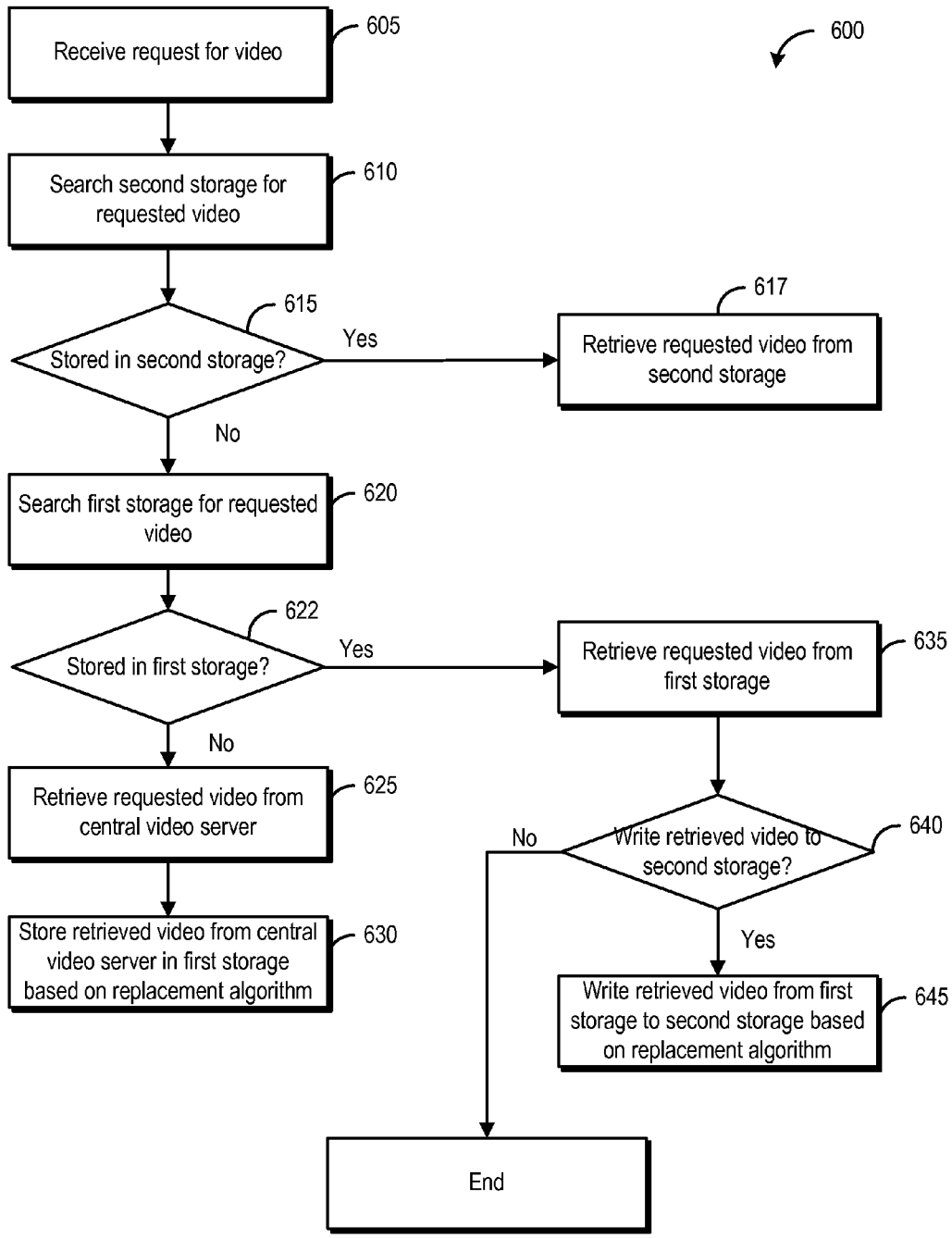
FIG. 6 illustrates an example process for implementing a video server with flash-based storage in the on-demand video delivery system of FIG. 5.

FIG. 6 illustrates an example process 600 for implementing a video server with flash-based storage in the on-demand video delivery system 500 of FIG. 5 using the storage system 200 of FIG. 2 to reduce the number of write/erase operations to the flash-based storage. For this example, it is assumed that an end user in geographical area 530(1) requests a video and the request is received by video server 520(1).

At stage 605, a request for a video is received. The request can be received, for example, by processor 580(1).

At stage 610, the second storage 570(1) is searched for the requested video.

At stage 615, a determination is made whether the requested video is stored in the second storage 570(1). If the requested video is stored on the second storage 570(1) ("Yes" at stage 615), then, at stage 617, the requested video is retrieved from the second storage 570(1) pursuant to the request received at stage 605. If the requested video is not stored on the second storage 570(1) ("No" at stage 615), then, at stage 620, the first storage 560(1) is searched for the requested video. At stage 622, a determination is made whether the requested video is stored in the first storage 560(1).

If the requested video is not stored in the first storage 560(1) ("No" at stage 620), then, at stage 625, the requested video is retrieved from the central video server 510. At stage 630, the retrieved video from the central video server 510 is stored in the first storage 560(1) instead of being written to the second storage 570(1). The retrieved video from the central video server 510 can replace stored video in the first storage 560(1) based on a replacement algorithm executed, for example, by processer 580(1).

If the requested video is stored in the first storage 560(1) ("Yes" at stage 622), then, at stage 635, the requested video is retrieved from the first storage 560(1) pursuant to the request received at stage 605.

At stage 640, a determination is made whether to write to the second storage 570(1) the requested video retrieved from the first storage 560(1) at stage 635. This determination can be made, for example, based on a storage management algorithm executed by, for example, processer 580(1) as discussed above. For example, in some implementations, requested video retrieved from the first storage is written to the second storage only after the video has been requested a predetermined number of times. In this way, write/erase operations to the flash-based storage 570(1) is reduced.

If it is determined at stage 640 to write to the second storage 570(1) the requested video retrieved from the first storage 560(1) at stage 635 ("Yes" at stage 340), then, at stage 645, the requested video is stored in the second storage 570(1). The retrieved video from the first storage 560(1) can replace stored video in the second storage 570(1) based on a replacement algorithm executed by, for example, processer 230.

Figure 7:
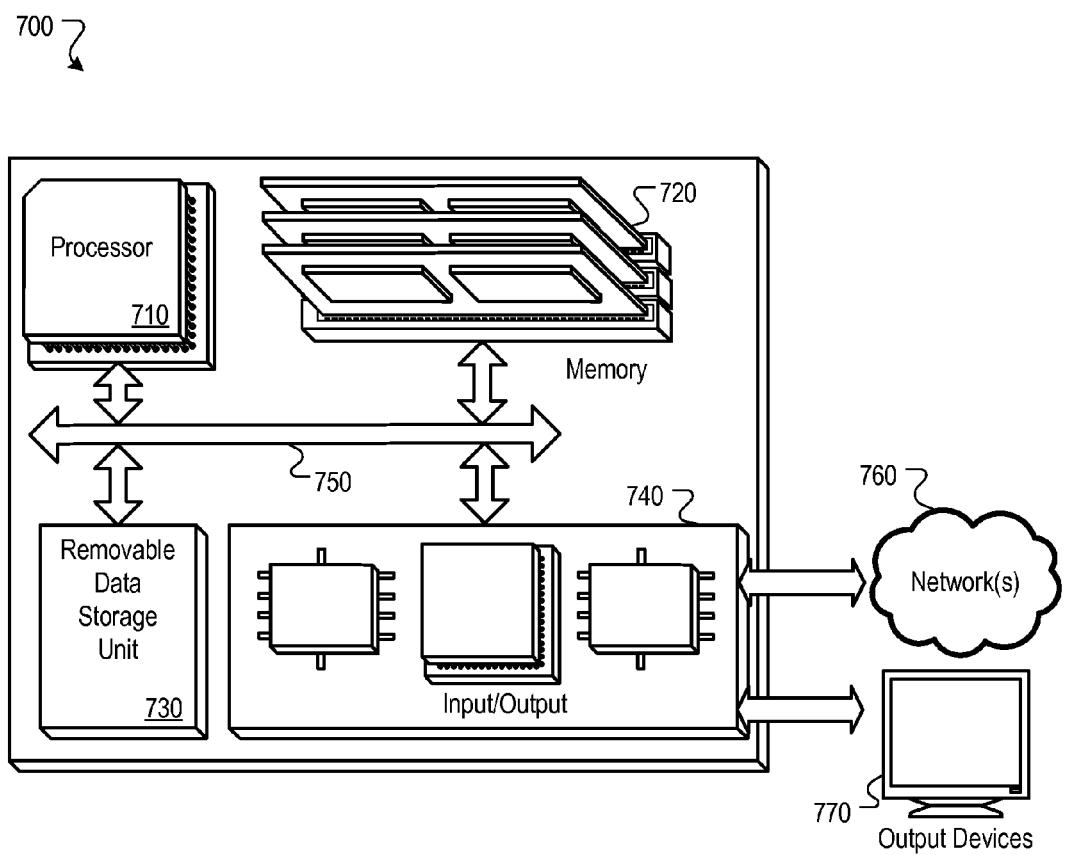
FIG. 7 is a block diagram illustrating an example video server operable to perform the example processes of FIGS. 3, 4, and 6.

FIG. 7 illustrates an example video server 700 operable to perform the example processes 300, 400, and 600 of FIGS. 3, 4, and 6 respectively. The video server 700 can include a processor 710, a memory 720, a removable data storage unit 730, and an input/output device 740. Each of the components 710, 720, 730, and 740 can, for example, be interconnected using a system bus 750. In some implementations, the video server 700 can include one of more interconnected boards where each board comprises components 710, 720, 730, and 740. The processor 710 is capable of processing instructions for execution within the video server 700. For example, the processor 710 can be capable of processing instructions for executing the processes 300, 400, and 600 of FIGS. 3, 4, and 6 respectively in the video server 700. In some implementations, the processor 710 is a single-threaded processor. In other implementations, the processor 710 is a multi-threaded processor. The processor 710 is capable of processing instructions stored in the memory 720 or on the storage device 730.

The memory 720 stores information within the video server 700. In some implementations, the memory 720 is a computer-readable medium. In other implementations, the memory 720 is a volatile memory unit. In still other implementations, the memory 720 is a non-volatile memory unit. In some implementations, the first storage 210 of FIG. 2 can be implemented by memory 720.

In some implementations, the storage device 730 is capable of providing mass storage for the video server 700. In one implementation, the storage unit 730 is a computer-readable medium. In various different implementations, the storage unit 730 can, for example, include a hard disk device, an optical disk device, flash memory or some other large capacity storage device. In some implementations, the data storage unit 730 is not removable. In some implementations, the second storage 220 of FIG. 2 can be implemented by storage unit 730.

The input/output device 740 provides input/output operations for the video server 700. In one implementation, the input/output device 740 can include one or more of a wireless interface, WAN/LAN network interface, such as, for example, an IP network interface device, e.g., an Ethernet card, a cellular network interface, a serial communication device, e.g., and RS-232 port, and/or a wireless interface device, e.g., an 802.11 card. In another implementation, the input/output device 740 can include driver devices configured to receive input data and send output data to other input/output devices, as well as sending communications to, and receiving communications from various networks.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a set-top-box (STB); an advanced television; or some other computing device that is integrated with or connected to (directly or indirectly) a display, e.g., a CRT (cathode ray tube) or LCD (liquid crystal display) monitor, for displaying information to the user. To provide for input by a user to the computer, implementations of the subject matter described in this specification further can be operable to interface with a keyboard, a pointing device (e.g., a mouse or a trackball), and/or a remote control device.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A computer-implemented method of reducing a number of write operations to storage, the method comprising:
   receiving a request for data;
   determining whether the requested data is stored in either a primary storage or a secondary storage, wherein the primary storage comprises flash-based storage, and wherein the secondary storage is non-flash storage;
   retrieving the requested data from an external storage and storing the retrieved data in the secondary storage if the requested data is not stored in either the primary storage or the secondary storage, wherein the retrieved data from the external storage is not simultaneously stored to both the primary storage and secondary storage; and
   retrieving the requested data from the secondary storage and storing the requested data in the primary storage based on a storage management algorithm if the requested data is not stored in the primary storage but stored in the secondary storage, wherein, according to the storage management algorithm, the requested data is stored in the primary storage after the data has been requested a predetermined number of times.

2. The computer-implemented method of claim 1 wherein the primary storage includes flash and a second storage media.

3. The computer-implemented method of claim 1 further comprising replacing stored data in the secondary storage with the retrieved data based on a first replacement algorithm.

4. The computer-implemented method of claim 1 further comprising removing from the secondary storage the retrieved data stored in the secondary storage after it is stored in the primary storage.

5. The computer-implemented method of claim 1 wherein retrieving the requested data from the secondary storage and storing the requested data in the primary storage based on a storage management algorithm if the requested data is not stored in the primary storage but stored in the secondary storage comprises storing the retrieved data from the secondary storage in the primary storage after the retrieved data has been stored in the secondary storage and requested a predetermined number of times.

6. The computer-implemented method of claim 1 further comprising replacing stored data in the primary storage with the retrieved data stored in the secondary storage based on a second replacement algorithm.

7. The computer-implemented method of claim 1 wherein the requested data is video.

8. A storage system comprising:
   primary storage, wherein the primary storage comprises flash-based storage;
   secondary storage, wherein the secondary storage is non-flash storage; and
   a non-transitory computer readable medium having instructions stored thereon for causing a computer to execute a method for reducing the number of write operations to the primary storage, the method comprising:
      determining whether requested data is stored in either the primary storage or the secondary storage;
      retrieving the requested data from an external storage and storing the retrieved data in the secondary storage if the requested data is not stored in either the primary storage or the secondary storage, wherein the retrieved data from the external storage is not simultaneously stored to both the primary storage and secondary storage; and
      retrieving the requested data from the secondary storage and storing the requested data in the primary storage based on a storage management algorithm if the requested data is not stored in the primary storage but stored in the secondary storage, wherein, according to the storage management algorithm, the requested data is stored in the primary storage after the data has been requested a predetermined number of times.

9. The storage system of claim 8 wherein the primary storage includes flash and a second storage media.

10. The storage system of claim 8, the method further comprising replacing stored data in the secondary storage with the retrieved data based on a first replacement algorithm.

11. The storage system of claim 8, the method further comprising removing from the secondary storage the retrieved data stored in the secondary storage after it is stored in the primary storage.

12. The storage system of claim 8 wherein retrieving the requested data from the secondary storage and storing the requested data in the primary storage based on a storage management algorithm if the requested data is not stored in the primary storage but stored in the secondary storage comprises storing the retrieved data from the secondary storage in the primary storage after the retrieved data has been stored in the secondary storage and requested a predetermined number of times.

13. The storage system of claim 8, the method further comprising replacing stored data in the primary storage with the retrieved data stored in the secondary storage based on a second replacement algorithm.

14. The storage system of claim 8 wherein the requested data is video.

15. A computer-implemented method of reducing a number of write operations to storage, the method comprising:
receiving a request for data;
determining whether the requested data is stored in a primary storage, wherein the primary storage comprises flash-based storage;
retrieving the requested data from an external storage if the requested data is not stored in the primary storage, wherein the external storage is non-flash storage;
determining whether a reference to the requested data is stored in a secondary storage, wherein the external storage is non-flash storage;
storing in the secondary storage a reference to the requested data if the requested data is not stored in the primary storage and a reference to the requested data is not stored in the secondary storage, wherein the reference to the requested data comprises a reference to the requested data at the external storage; and
storing in the primary storage the retrieved data based on a storage management algorithm, wherein, according to the storage management algorithm, the retrieved data is stored in the primary storage after the data has been requested a predetermined number of times;
wherein the retrieved data from the external storage is not simultaneously stored to both the primary storage and secondary storage.

16. The computer-implemented method of claim 15 wherein the primary storage includes flash and a second storage media.

17. The computer-implemented method of claim 15 wherein storing in the secondary storage a reference to the requested data if the requested data is not stored in the primary storage and a reference to the requested data is not stored in the secondary storage comprising replacing in the secondary storage a stored reference to data in the external storage with the reference to the requested data based on a first replacement algorithm.

18. The computer-implemented method of claim 15 further comprising incrementing a counter for the requested data each time the requested data is retrieved from the external storage.

19. The computer-implemented method of claim 18 wherein storing in the primary storage the retrieved data based on a storage management algorithm comprises storing the retrieved data from the external storage in the primary storage after the retrieved data has been requested a predetermined number of times based on the counter.

20. The computer-implemented method of claim 15 further comprising replacing stored data in the primary storage with the retrieved data based on a second replacement algorithm.

21. The computer-implemented method of claim 15 wherein the requested data is video.

22. A storage system comprising:
primary storage, wherein the primary storage comprises flash-based storage;
secondary storage, wherein the secondary storage is non-flash storage; and
a non-transitory computer readable medium having instructions stored thereon for causing a computer to execute a method for reducing the number of write operations to the primary storage, the method comprising:
determining whether requested data is stored in the primary storage;
retrieving the requested data from an external storage if the requested data is not stored in the primary storage, wherein the external storage is non-flash storage;
determining whether a reference to the requested data is stored in the secondary storage;
storing in the secondary storage a reference to the requested data if the requested data is not stored in the primary storage and a reference to the requested data is not stored in the secondary storage, wherein the reference to the requested data comprises a reference to the requested data at the external storage; and
storing in the primary storage the retrieved data based on a storage management algorithm, wherein, according to the storage management algorithm, the retrieved data is stored in the primary storage after the data has been requested a predetermined number of times;
wherein the retrieved data from the external storage is not simultaneously stored to both the primary storage and secondary storage.

23. The storage system of claim 22 wherein the primary storage includes flash and a second storage media.

24. The storage system of claim 22, wherein storing in the secondary storage a reference to the requested data if the requested data is not stored in the primary storage and a reference to the requested data is not stored in the secondary storage comprising replacing in the secondary storage a stored reference to data in the external storage with the reference to the requested data based on a first replacement algorithm.

25. The storage system of claim 22, the method further comprising incrementing a counter for the requested data each time the requested data is retrieved from the external storage.

26. The storage system of claim 25, wherein storing in the primary storage the retrieved data based on a storage management algorithm comprises storing the retrieved data from the external storage in the primary storage after the retrieved data has been requested a predetermined number of times based on the counter.

27. The storage system of claim 22, the method further comprising replacing stored data in the primary storage with the retrieved data based on a second replacement algorithm.

28. The storage system of claim 22 wherein the requested data is video.

* * * * *